Patented Mar. 13, 1945

2,371,359

UNITED STATES PATENT OFFICE 2,371,359

METHOD OF PRODUCING SOLUTION CONTAINING CELLULOSIC MATERIAL

Richard S. Shutt, Columbus, Ohio, assignor to Batelle Memorial Institute, Columbus, Ohio, a corporation of Ohio No Drawing. Application December 30, 1941, Serial No. 424,968

8 Claims. (Cl. 106—203)

This invention relates to the production of shaped articles of regenerated cellulose, and it comprises an improved process for the production of films, fibers, sheets, rods, tubes, and other shaped articles of regenerated cellulose, wherein cellulosic material is dissolved in an aqueous solution of a suitable sulfonium base, and recovered in the desired form after spinning, extrusion, or other suitable treatment; and it comprises certain novel spinning solutions employed in the process, and the novel products obtained therefrom; all as more fully hereinafter set forth and as claimed.

In the production of fibers and other shaped articles of regenerated cellulose, the well-known viscose process has been widely used heretofore. However, this process has certain inherent disadvantages. For example, the preparation of the alkali cellulose, its aging, the preparation of the xanthate solution, and the maturing of the xanthate solution are time-consuming steps, and require large amounts of space for their execution. Also, the carbon disulfide used in the preparation of the xanthate solution is an evil smelling, volatile substance, and its use involves risk of fire and explosion, as well as presenting a menace to the health of those handling it. Furthermore, after the viscose solution has been coagulated into fibers, it is necessary to give the fibers some special treatment to remove sulfur from them, since the presence of sulfur is objectionable in the finished yarn and other shaped articles.

It is an object achieved by the present invention to provide an improved process for the production of shaped articles of regenerated cellulose, which does not involve the objectionable features encountered in the usual viscose process.

This is accomplished in accordance with this invention by initially dissolving the cellulose or cellulosic material in a strong aqueous solution of a sulfonium base. The solution is then filtered and deaerated, and extruded through a spinneret or other suitable orifice, into a coagulating bath. The shaped, coagulated cellulose article is withdrawn from the bath, and washed or subjected to suitable after-treatments, as may be desired.

I have found that strong aqueous solutions of many sulfonium bases of suitable composition will dissolve 10 per cent or more of cellulose and cellulosic materials, thus forming cellulose solutions which are filterable. Certain other sulfonium bases will dissolve cellulose to some extent, but produce solutions which are highly viscous. Still other sulfonium bases will not dissolve cellulose, even in highly concentrated solutions of the base, but merely swell it.

For the purposes of this invention, it is desirable and generally necessary to employ solutions of sulfonium bases which will dissolve at least 5 per cent cellulose to form solutions capable of filtration. Examples of suitable sulfonium bases of this type are triethyl sulfonium hydroxide, methyl di-n-propyl sulfonium hydroxide, methyl ethyl n-butyl sulfonium hydroxide, methyl di-n-butyl sulfonium hydroxide, methyl di-isobutyl sulfonium hydroxide, ethyl di-n-butyl sulfonium hydroxide, and methyl di-n-amyl sulfonium hydroxide. An example of a sulfonium base which dissolves cellulose but gives solutions of high viscosity is di-ethyl methyl sulfonium hydroxide. Examples of sulfonium bases which do not dissolve cellulose, but only swell it, are tri-methyl sulfonium hydroxide, and di-methyl t-butyl sulfonium hydroxide.

Generally, the sulfonium bases which are useful for the purposes of this invention contain a total of at least 5 carbon atoms and at least two of the hydro-carbon radicals attached to the sulfur atom each contain more than one carbon atom.

In the process of this invention, the sulfonium bases are employed in aqueous solution and there is, of course, a minimum concentration below which they are not effective as solvents for cellulose. This minimum varies with the different bases, but in general, none of the bases is an effective solvent in concentrations below about 20 per cent by weight. Since it is desirable, from the economic standpoint, to use the lowest concentrations which give satisfactory results, I generally employ concentrations of sulfonium bases in the range from 27 per cent to 50 per cent by weight, and advantageously in the range from 32 per cent to 45 per cent by weight. Higher concentrations may be used if desired, however, and my invention is not limited to the specific ranges mentioned.

Various methods of preparing sulfonium bases are well-known, and the bases used in accordance with this invention may be prepared in any known manner.

The following examples, in which "parts" are parts by weight, unless otherwise specified, illustrate useful embodiments of the invention:

*Example 1*

356 parts of air-dry, bleached sulfite wood pulp were immersed in 4050 parts of 21% caustic soda solution for one hour at 20° C. and then pressed to a weight of 1068 parts. The resulting alkali cellulose was crumbed and then regenerated by washing with distilled water, dilute acetic acid and finally with distilled water until free of acid. The regenerated cellulose was dried over night at 70–75° C.

60 parts of the dried cellulose and 1065 parts of 2.16N di-n-butyl methyl sulfonium hydroxide solution were mixed together in a Werner and Pfleiderer type mixer. Within 1½ hours the cellulose was completely dissolved and a syrupy liquid was formed. This solution was filtered through two layers of 60-mesh copper screen, two layers of 200-mesh copper screen, and finally through a fritted glass filter. The syrupy, transparent solution was then deaerated under reduced pressure.

The cellulose solution was forced, under pressure, through a conventional candle filter, in which the filter medium was a 200-mesh copper screen, and extruded through a 40-hole spinneret with orifice diameters of 0.0045 inch. It was coagulated in a 20% sulfuric acid bath at a temperature of 60° C. The length of travel of the fibers under the bath was 18 inches, and their rate of travel was 40 feet per minute. The fibers were stretched to 1.2 times their original length before being collected on a perforated bobbin. The washing of the fibers was carried out by immersing the bobbins in various wash solutions and drawing the solutions through the fibers by means of suction. The above fibers were washed for ½ hour in 1% ammonia solution, 1 hour in distilled water and ½ hour in dilute soap solution and dried in the air at room temperature. The yarn possessed a good luster, good tensile strength and was soft and pliant.

Fibers were also prepared from the above solution by coagulation in a 10% sulfuric acid bath at 60° C., all other conditions being the same. The yarn was similar to that produced in the stronger acid bath.

Example 2

60 parts of regenerated cellulose, prepared as in Example 1, were dissolved in 1075 parts of 2.40N tri-ethyl sulfonium hydroxide solution. The solution was filtered, deaerated and spun as in Example 1.

Both 15% and 20% sulfuric acid coagulating baths at 60° C. gave yarn similar to that obtained in Example 1.

Example 3

Regenerated cellulose was prepared as in Example 1 except that after the crumbing operation the alkali cellulose was spread thinly in glass trays and allowed to stand at 20° C. for 12 hours before it was regenerated.

100 parts of this cellulose were dissolved in 1075 parts of 2.45N tri-ethyl sulfonium hydroxide solution. Good yarn was obtained from this solution when it was extruded into a 20% sulfuric acid solution at 60° C.

Example 4

A good yarn was also obtained from a solution consisting of 1075 parts of 2.50N tri-ethyl sulfonium hydroxide solution and 110 parts of regenerated alkali cellulose prepared as in Example 3. The coagulating bath contained 20% sulfuric acid and was maintained at 60° C.

Example 5

Regenerated cellulose was prepared as in Example 3 except that the alkali cellulose was allowed to age for 48 hours before it was regenerated.

120 parts of this cellulose dissolved in 1075 parts of 2.30N di-n-butyl methyl hydroxide solution gave a solution with a viscosity suitable for spinning. This solution was coagulated by means of a 20% sulfuric acid bath maintained at 60° C. to give good yarn.

Example 6

Regenerated cellulose was prepared as in Example 3 except that the alkali cellulose was aged for 24 hours before regeneration.

100 parts of this cellulose were dissolved in 1075 parts of 2.30N di-n-butyl methyl sulfonium hydroxide solution. A portion of this solution was coagulated in an aqueous bath containing 20% sulfuric acid and maintained at 40° C.

A second portion of this solution was coagulated in a spinning bath consisting of 20% sulfuric acid in a 1:1 by volume mixture of methanol and water maintained at 60° C.

The yarns produced by both of these baths were very much alike and similar to those obtained in Example 1.

Example 7

100 parts of regenerated cellulose, prepared as in Example 5, were dissolved in 1075 parts of 2.30N di-n-butyl methyl sulfonium hydroxide solution. This solution was coagulated in an aqueous bath containing 222 g. of sodium sulfate, 80 g. of magnesium sulfate and 40 g. of zinc sulfate per liter and maintained at 65° C. A good yarn was obtained.

Example 8

A cellulose solution made up as in Example 3 was coagulated in an aqueous bath containing 15% sulfuric acid and 33% tri-ethyl sulfonium sulfate maintained at 50° C. The yarn obtained was similar to that obtained in Example 3.

Example 9

100 parts of bleached sulfite pulp were added to 1075 parts of 2.08N di-n-butyl methyl sulfonium hydroxide solution and the mixture was stirred until the wood pulp had completely dissolved. 1000 parts of pyridine were then added, and the mixture was stirred until the solution was homogeneous. The syrupy liquid was filtered, deaerated and then spun. The coagulating bath was a 10% sulfuric acid solution maintained at 60° C.

Example 10

A solution of 120 parts of regenerated cellulose, which had been aged for 18 hours as alkali cellulose, in 1121 parts of a 2.45N tri-ethyl sulfonium hydroxide solution was prepared for spinning as described in Example 1.

A portion of this solution was coagulated in a bath consisting of a 15% aqueous solution of oxalic acid maintained at 60° C.

Another portion of the above cellulose solution was coagulated in a bath consisting of a 10% aqueous solution of phosphoric acid maintained at 55° C.

The yarn obtained from both the above coagulating baths was similar to that obtained from the sulfuric acid baths.

The above examples illustrate the application of this invention to the spinning of continuous filaments from sulfonium base solutions of cellulose, but it will be obvious to one skilled in the art that the invention can also be applied to the production of staple fibers. Also, if the cellulose solution is extruded through a narrow slit into the coagulating bath, instead of through a spinneret as in the above examples, ribbons or films of regenerated cellulose can be produced. Other shapes can be produced by selecting suitable orifices. Thus, the invention comprises the production of regenerated cellulosic materials in any desired form, and may be applied to the production of filaments, threads, yarn, ribbons, films, and sponges, rods, tubes and the like.

The cellulosic material used as a starting material in this process may be derived from any of the common sources of cellulose, such as cotton or wood pulp. Bleached or unbleached sulfite or sulfate wood pulp, bleached or unbleached cotton linters, regenerated cellulose such as that obtained from viscose or cuprammonium solutions, regenerated alkali cellulose, hydrated or hydrocellulose, cellulose oxidation products and other modified celluloses may also be used.

For the preparation of fibers of good strength, I prefer to use a cellulose containing initially a high content of alpha cellulose. The celluloses which are somewhat degraded give less viscose solutions when dissolved in solutions of sulfonium bases than do the undegraded celluloses. Therefore, in order to prepare cellulose solutions of high cellulose content and relatively low viscosity, I often find it advantageous to use a cellulose which has been partially degraded. For economic reasons, it is generally advantageous to use solutions containing as much cellulose as possible, and I prefer solutions containing 10% or more of cellulose by weight and having suitable viscosities. However, the process is not limited to the use of such solutions.

In addition to cellulose and the degraded and modified celluloses previously mentioned, alkali soluble cellulose derivatives such as hydroxyethyl cellulose, methyl cellulose, ethyl cellulose, cellulose glycolic acid, etc., may be used in the practice of this invention. All such substances are included in the term "cellulosic material." For example, a hydroxyethylcellulose of a low degree of substitution may be dissolved in a sulfonium base and the solution used for the preparation of films or fibers in the same manner as cellulose.

In the preparation of the solutions of cellulosic material used in the practice of this invention, no special precautions need to be taken to exclude air during the mixing process. However, if it is desired to avoid the degradative effects of oxygen on the cellulose solution, air may be excluded during the mixing and subsequent operations, or these operations may be carried out in an inert atmosphere such as nitrogen, hydrogen, etc. On the other hand, if a certain amount of oxidative degradation is desired, controlled amounts of air or oxygen may be admitted to the solution.

The solutions may be maintained at ordinary temperatures or at higher temperatures throughout the process, but it is preferred to maintain the temperature of the cellulose solutions below 25° C.

After the cellulosic material has been dissolved in the sulfonium base solution, it may be diluted with more sulfonium base solution, with water, with aqueous solutions of other organic bases, organic salts, inorganic bases and salts, or with an organic liquid. Many different organic liquids, such as acetone, dioxan, ethylene diamine, aniline, iso-quinoline, morpholine, pyridine, n-butyl amine, benzyl amine and the like may be used.

Ordinary cellulosic filter cloths are not suitable for use in the filtration step in this process, since the cellulose solution still has the power to dissolve more cellulose. However, fritted glass filter media or glass or wire cloths serve very well for the filtration of the cellulose solutions.

Many different types of coagulating baths are satisfactory for use in this process. Thus, aqueous solutions of acids, inorganic salts, organic substances and mixtures of the same may be used with good results. For example, any of the coagulating baths known to the viscose industry may be employed.

However, it is desirable from the economic standpoint to provide for recovery of the sulfonium base from the coagulating bath, and I prefer not to complicate the recovery of the base by introducing into the bath materials which cannot be easily and inexpensively removed. I have found that the presence of relatively small amounts of certain cations, such as sodium, in a sulfonium base solution renders the solution less effective as a cellulose solvent. Since the removal of sodium, potassium, and the like from aqueous solutions is a difficult and expensive procedure, it is advantageous not to add these ions to the coagulating bath. The presence of a considerable concentration of sulfonium ions in the coagulating bath is advantageous, however, since it simplifies the recovery of sulfonium base.

The acids which are best adapted for use in the coagulating bath are those which are capable of forming metal salts of low solubility in water. Sulfuric, oxalic and phosphoric acids are especially suited for use as coagulants, since they may easily be removed as the insoluble barium, calcium, strontium, or lead salts during the steps involved in recovering the sulfonium base from the coagulating medium. The amount of acid in the coagulating bath may be varied widely, since the concentration required to effect sufficiently rapid coagulation of the cellulose is dependent upon the strength of the acid, the length of travel and rate of travel of the fibers through the bath, and the temperature of the bath.

The recovery of the sulfonium base from the coagulating medium may be effected by any convenient method. When acids such as sulfuric, phosphoric and the like are used as coagulants, it is convenient to neutralize the acid with calcium carbonate or calcium hydroxide and filter off the insoluble calcium salt. This leaves a solution of a sulfonium salt, which may be reconverted to the base, as by treatment with barium hydroxide. The sulfonium base may then be concentrated by evaporation under reduced pressure, and used again in the process.

The fibers and other shaped articles produced from cellulose solutions in sulfonium bases may be processed and collected according to any of the methods known to those skilled in the art. They may be collected directly without being stretched, or they may be stretched, either under the coagulating bath or outside the bath, before being collected. The fibers may also be produced and finished by continuous processes. The fibers may be given any suitable finishing treatment. They may be bleached, lubricated, soaped, or treated with various waterproofing and flame-proofing substances. It is an advantage of this process that no desulfurizing step is necessary.

The description and examples hereinabove are intended merely as illustrations of useful embodiments of the invention, and it is to be understood that the invention is not limited thereto and that any variations which conform to the spirit of the invention are intended to be included within the scope of the appended claims.

What I claim is:

1. The method of producing a solution containing in excess of 5 per cent of cellulosic material and adapted for extrusion into a coagulating bath to form shaped articles of regenerated cellulose which consists in dissolving said cellulosic material in an essentially aqueous solution containing at least 27 per cent of a compound selected from the group consisting of tri-ethyl sulfonium hydroxide, di-n-butyl methyl sulfonium hydroxide, and di-n-butyl ethyl sulfonium hydroxide.

2. The method of producing a solution containing in excess of 5 per cent of cellulosic material and adapted for extrusion into a coagulating bath to form shaped articles of regenerated cellulose which consists in dissolving said cellulosic material in an essentially aqueous solution containing at least 27 per cent of tri-ethyl sulfonium hydroxide.

3. The method of producing a solution containing in excess of 5 per cent of cellulosic material and adapted for extrusion into a coagulating bath to form shaped articles of regenerated cellulose which consists in dissolving said cellulosic material in an essentially aqueous solution containing at least 27 per cent of di-n-butyl methyl sulfonium hydroxide.

4. The method of producing a solution containing in excess of 5 per cent of cellulosic material and adapted for extrusion into a coagulating bath to form shaped articles of regenerated cellulose which consists in dissolving said cellulosic material in an essentially aqueous solution containing at least 27 per cent of di-n-butyl ethyl sulfonium hydroxide.

5. The method of producing a solution containing in excess of 10 per cent of cellulosic material and adapted for extrusion into a coagulating bath to form shaped articles of regenerated cellulose which consists in dissolving said cellulosic material, at a temperature below 25° C., in an essentially aqueous solution containing from 32 to 45 per cent of a compound selected from a group consisting of tri-ethyl sulfonium hydroxide, di-n-butyl methyl sulfonium hydroxide, and di-n-butyl ethyl sulfonium hydroxide.

6. The method of producing a solution containing in excess of 10 per cent of cellulosic material and adapted for extrusion into a coagulating bath to form shaped articles of regenerated cellulose which consists in dissolving said cellulosic material, at a temperature below 25° C., in an essentially aqueous solution containing from 32 to 45 per cent of tri-ethyl sulfonium hydroxide.

7. The method of producing a solution containing in excess of 10 per cent of cellulosic material and adapted for extrusion into a coagulating bath to form shaped articles of regenerated cellulose which consists in dissolving said cellulosic material, at a temperature below 25° C., in an essentially aqueous solution containing from 32 to 45 per cent of di-n-butyl methyl sulfonium hydroxide.

8. The method of producing a solution containing in excess of 10 per cent of cellulosic material and adapted for extrusion into a coagulating bath to form shaped articles of regenerated cellulose which consists in dissolving said cellulosic material, at a temperature below 25° C., in an essentially aqueous solution containing from 32 to 45 per cent of di-n-butyl ethyl sulfonium hydroxide.

RICHARD S. SHUTT.